(12) United States Patent
Mayerle et al.

(10) Patent No.: US 7,021,224 B2
(45) Date of Patent: Apr. 4, 2006

(54) DUAL CAPABILITY NURSE DISTRIBUTION SYSTEM

(75) Inventors: Dean J. Mayerle, Saskatoon (CA); Ronald Engen, Beaumont (CA); P. Allen Evans, Slater, IA (US)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 11/009,121

(22) Filed: Dec. 10, 2004

(65) Prior Publication Data

US 2005/0126458 A1    Jun. 16, 2005

Related U.S. Application Data

(62) Division of application No. 10/281,974, filed on Oct. 29, 2002, now Pat. No. 6,845,724.

(51) Int. Cl.
*A01C 7/20* (2006.01)

(52) U.S. Cl. ........................... 111/174; 221/211

(58) Field of Classification Search ............... 111/200, 111/170, 174–188; 221/211; 222/52, 53, 222/544, 556; 239/656

See application file for complete search history.

(56) References Cited

U.S. PATENT DOCUMENTS

| 4,060,181 | A | 11/1977 | Grataloup |
| 5,161,102 | A | 11/1992 | Griffin et al. |
| 5,161,473 | A | 11/1992 | Landphair et al. |
| 5,847,389 | A | 12/1998 | Mertins et al. |
| 5,913,915 | A | 6/1999 | McQuinn |
| 5,915,313 | A | 6/1999 | Bender et al. |
| 6,003,455 | A | 12/1999 | Flamme et al. |
| 6,047,652 | A | 4/2000 | Prairie et al. |
| 6,158,363 | A | 12/2000 | Memory et al. |
| 6,193,175 | B1 | 2/2001 | Andersson et al. |
| 6,289,830 | B1 | 9/2001 | Mayerle et al. |
| 6,298,797 | B1 | 10/2001 | Mayerle et al. |

*Primary Examiner*—Christopher J. Novosad
(74) *Attorney, Agent, or Firm*—Rebecca Henkel

(57) ABSTRACT

A nurse distribution system provides dual capabilities for planting different seed varieties from a single planting mechanism. The air cart carries two tanks in which different seed varieties can be placed. The nurse mechanism selectively distributes seed from one tank to the on-row singulation meters, yet can switch to the seed in the second tank to correspond to different soil conditions encountered by the planting mechanism. The planting mechanism carries a first line from the first tank to the nurse receiver and a parallel second line from the second tank to the same nurse receiver. By keeping the nurse receiver as small as possible, thus having a small seed reservoir, the seed variety selection can be switched from one tank to the other in an effective manner.

6 Claims, 12 Drawing Sheets

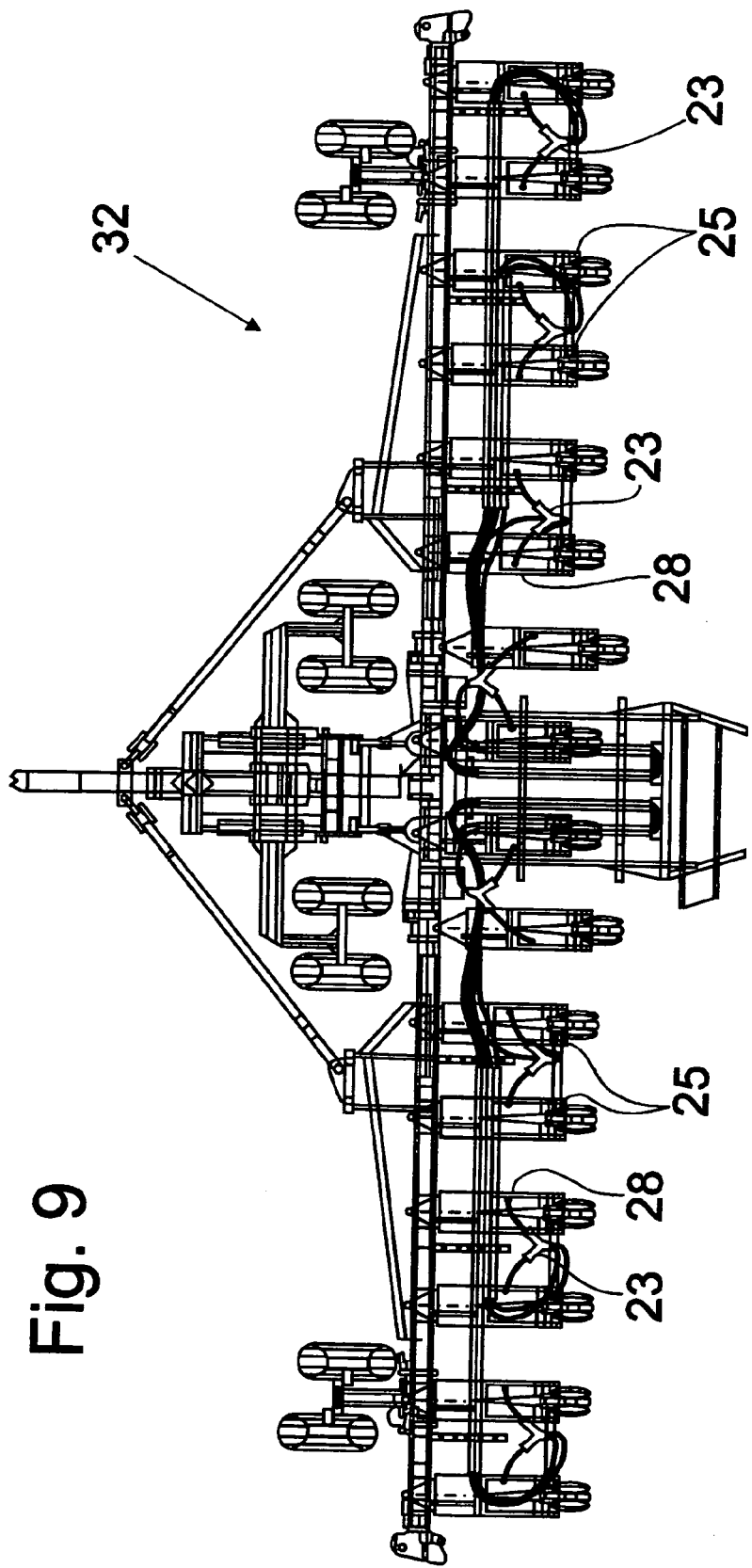

DUAL CAPABILITY NURSE DISTRIBUTION SYSTEM

CROSS REFERENCE TO RELATED APPLICATIONS

This Patent Application is a Divisional of, and claims priority to under 35 U.S.C. §120, U.S. patent application Ser. No. 10/281,974, filed on Oct. 29, 2002, now U.S. Pat. No. 6,845,724, entitled, "Dual Capability Nurse Distribution System" and having Dean J. Mayerle, Ronald Engen and P. Allen Evans as the Inventor. The full disclosure of U.S. Patent application Ser. No. 10/281,974 is hereby fully incorporated by reference.

FIELD OF THE INVENTION

The present invention relates generally to air seeders for planting seeds in the ground in an agricultural environment. In particular, the present invention relates to a nurse inductor system co-operable with a planter mechanism to feed multiple varieties of seeds or other particulate materials to a planting mechanism for insertion of those materials into the ground.

BACKGROUND OF THE INVENTION

As the size of agricultural implements continues to grow, the versatility of such implements becomes more significant. Large air seeders have become increasingly popular for the planting of seeds, fertilizer, and other product without strict regard for the exact placement of the seeds particles. For crop planting operations that require seed singulation, nurse systems are used to feed seed or other particles from larger hoppers into smaller reservoirs located at the singulation meters. A nurse inductor system enables an air cart typically used for dryland farming (cereal crops, etc.), to be adapted for use in row crop planting applications, such as corn and soybean, though not limited to soybean and corn. A nurse inductor system along with a central fill hopper can be used to enable a farmer to plant more acres before having to stop to fill the planter, resulting in quicker planting and less labor, while maintaining the precision spacing available by on-row singulation.

In U.S. Pat. No. 5,161,473, a nurse system is disclosed which works off a specialized cart. The air comes into the seed delivery area coaxial with the seed tube that takes the air and seed to the row units. With this system substantial energy is used to nurse the seed since the air changes direction abruptly. This particular nurse system provides a dedicated fan to feed the 12 rows to be planted from the nurse system. This system requires the adding or removing of shims to adjust for different line lengths, which is difficult and inconvenient to accomplish. The seed cart includes two tanks and has a number of primary nurse lines running to each row unit hopper, commonly referred to as parallel distribution. Half of the lines run from one tank while the other half of the planting mechanism is nursed from the second tank. While different seeds can be put in the two tanks, the planter is not capable of switching back and forth between seed varieties to service the entire machine.

In U.S. Pat. No. 6,047,652, the planter has a hopper mounted on each wing of a front folding tool bar supporting the planting mechanism. This nurse distribution system is a series system with one line running from each hopper and each line serving half of the planting mechanism. Like the nurse system described in U.S. Pat. No. 5,161,473, the two tanks could theoretically carry different seed varieties, but neither tank could deliver alternate seed varieties to the entire machine.

U.S. Pat. No. 6,193,175 teaches a switching mechanism that allows two different hoppers to supply a single central singulation drum. Seed is singulated at the central hopper and is blown to the seed row. While this patent does not teach a nurse distribution system, the teaching does provide for carrying two different seed varieties on the planter and for switching between the seed varieties. The utilization of a central singulation meter does not provide the capability of producing seed spacing within the row as accurately as individual "on-row" singulation meters. Accordingly, this patent also fails to teach a nurse distribution system that can feed individual on-row planting mechanisms.

Air seeders are commonly set-up with double or triple shoot air systems. With a double shoot system, the product from one tank is delivered to the opener, and the product from a second tank is delivered to a second part of the same opener. Most air carts have a simple method of switching from a double shoot configuration to a single shoot configuration.

Another example of a nurse system is disclosed in U.S. Pat. No. 5,161,102 to Kongskilde. This nurse system distributes grain from a central hopper to a number of smaller hoppers. A metering device on each small hopper delivers to a number of seed boots. In this particular system, the operator is able to shut off one of the meter rollers independent of the other meter rollers, and is therefore able to stop the rotation of one section on the roller independent of the others. However, this system does not permit the operator to shut off the delivery to any of the nurse lines independently. U.S. Pat. No. 4,060,181 teaches another nurse embodiment with varying problems.

It is known to be desirable to plant different varieties of the same crop in different soil zones such that the seed variety is matched to the soil conditions for optimal growth opportunities. Coupling the nurse technology to permit the utilization of air seeders to feed row crop planters having a singulator with the desire to plant specific seed varieties in different soil zones of the same field has been a difficult task. Current nursing technology has only focused on the delivery of one type of seed from a central tank to a receiver located above the seed singulator on the row unit, commonly referred to as single shoot. Some systems have a single tank delivering to all receivers; others can have two tanks mounted on the planter, each tank delivering to half of the machine. With the two-tank system it is possible to carry a different variety of seed in each tank, however each tank only serves half of the machine. With these systems it is not possible to have the entire machine plant one variety from the one tank and easily change over to plant a second variety from the second tank.

It is therefore desirable to provide a nurse inductor system that couples the nurse distribution technology to permit the utilization of air seeders to feed row crop planters having a singulator with the desire to plant specific seed varieties in different soil zones of the same field.

SUMMARY OF THE INVENTION

Accordingly, an important object of the present invention is to provide a nurse inductor system that couples the nurse distribution technology to permit the utilization of air seeders to feed row crop planters having a singulation meter with the desire to plant specific seed varieties in different soil zones of the same field.

It is another object of this invention to provide a nurse inductor system operable for use with planters requiring singulation of the seeds for planting in the ground.

It is yet another object of the present invention to provide a nurse inductor system that can be easily switched from one crop variety to another.

It is a feature of this invention that the nurse inductor system enables the use of an existing air cart for nursing individual planter units in a passive manner.

It is another feature of this invention that replacement of existing components on a conventional air cart with nurse induction components, to convert the standard air cart without requiring permanent modifications to the cart.

It is yet another feature of the present invention that the operator can plant seed varieties to match changes in soil types while planting in the field.

It is another advantage of this invention that switching individual nurse distribution lines to provide multiple seed variety capabilities from one tank to another would not be necessary.

It is a further feature of this invention that the nurse receiver is kept as small as possible to allow for a quick change from one seed variety to another without interrupting the planting operation.

It is a further advantage of this invention that the operator can carry a first seed variety in one tank for planting in a first field and a second seed variety in another tank for planting in a second field.

It is still a further object of this invention to provide a nurse inductor mechanism for an agricultural seeding implement providing dual seed variety planting capability, which is durable in construction, inexpensive of manufacture, carefree of maintenance, facile in assemblage, and simple and effective in use.

These and other objects, features, and advantages are accomplished according to the present invention by providing a nurse distribution system providing dual capabilities for planting different seed varieties from a single planting mechanism. The air cart carries two tanks in which different seed varieties can be placed. The nurse mechanism selectively distributes seed from one tank to the on-row singulators, yet can switch to the seed in the second tank to correspond to different soil conditions encountered by the planting mechanism. The planting mechanism carries a first line from the first tank to the nurse receiver and a parallel second line from the second tank to the same nurse receiver. By keeping the nurse receiver as small as possible, thus having a small seed reservoir, the seed variety selection can be switched from one tank to the other in an effective manner.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein:

FIG. 9 is a top plan view of a planter mechanism similar to that of FIG. 8 but depicting an alternative dual capability nurse mechanism;

FIG. 10b is a top plan view of the receiver header shown in FIG. 10a;

FIG. 10c is a front elevational view of the receiver header shown in FIG. 10a;

FIG. 10d is a side elevational view of the receiver header shown in FIG. 10a;

DETAILED DESCRIPTION OF THE PREFERRED EMBODIMENTS

Figure 1:
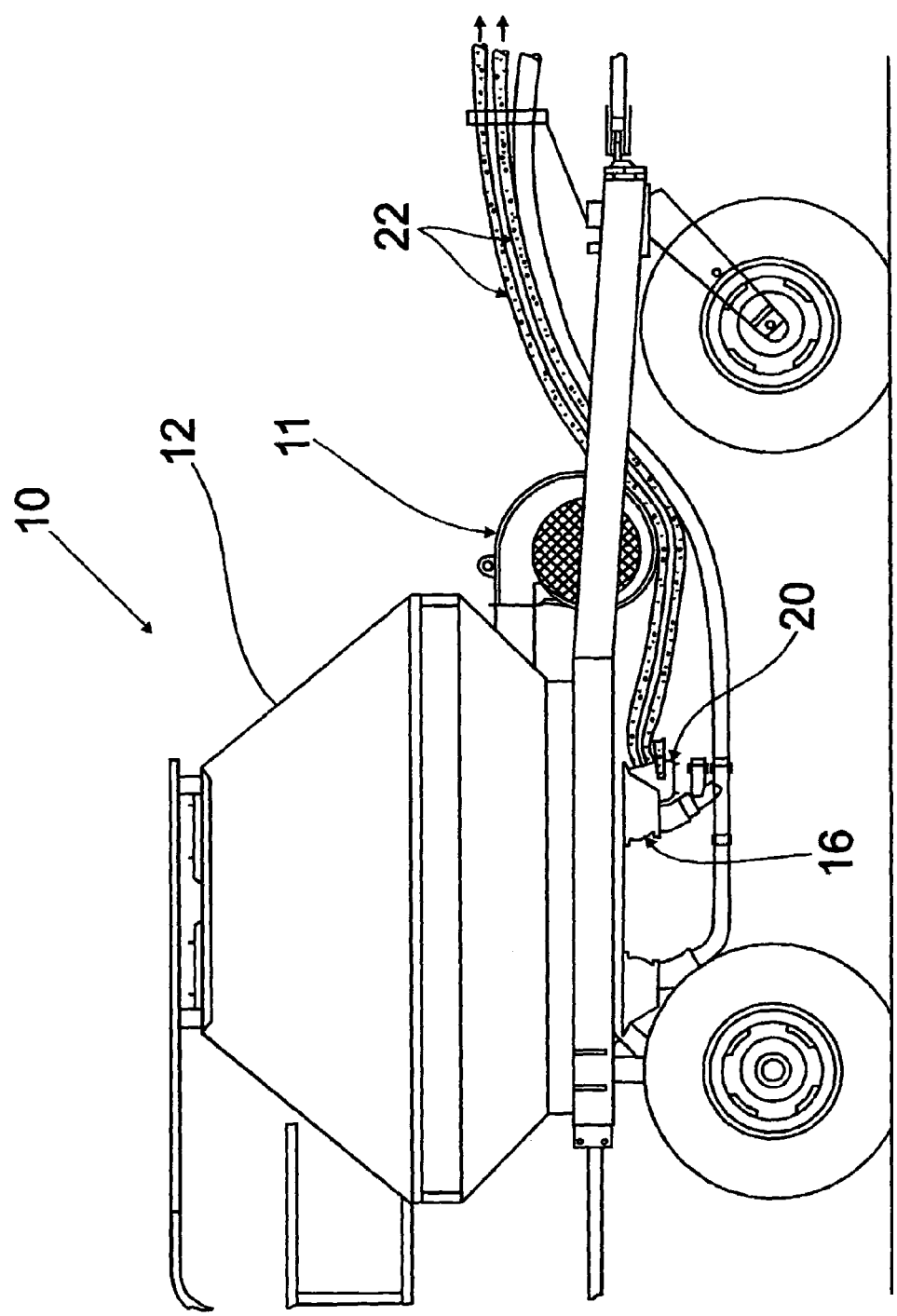
FIG. 1 is a side elevational view of a typical air seeder mechanism on which a nurse induction mechanism incorporating the principles of the instant invention is mounted.
Figure 2:
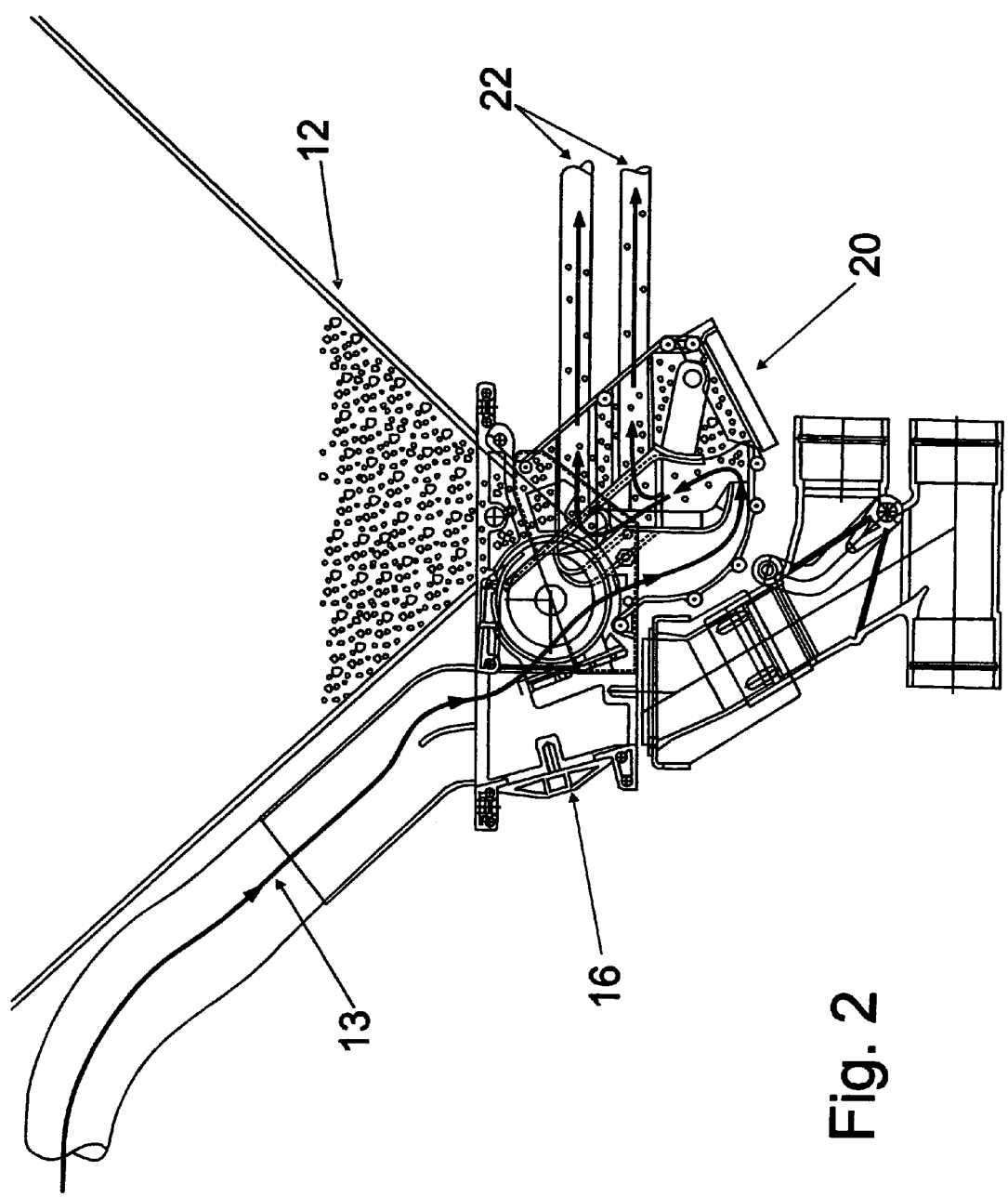
FIG. 2 is a schematic cross-sectional view of the nurse induction system depicted in FIG. 1, the arrows depicting the direction of air flow through the mechanism.
Figure 3:
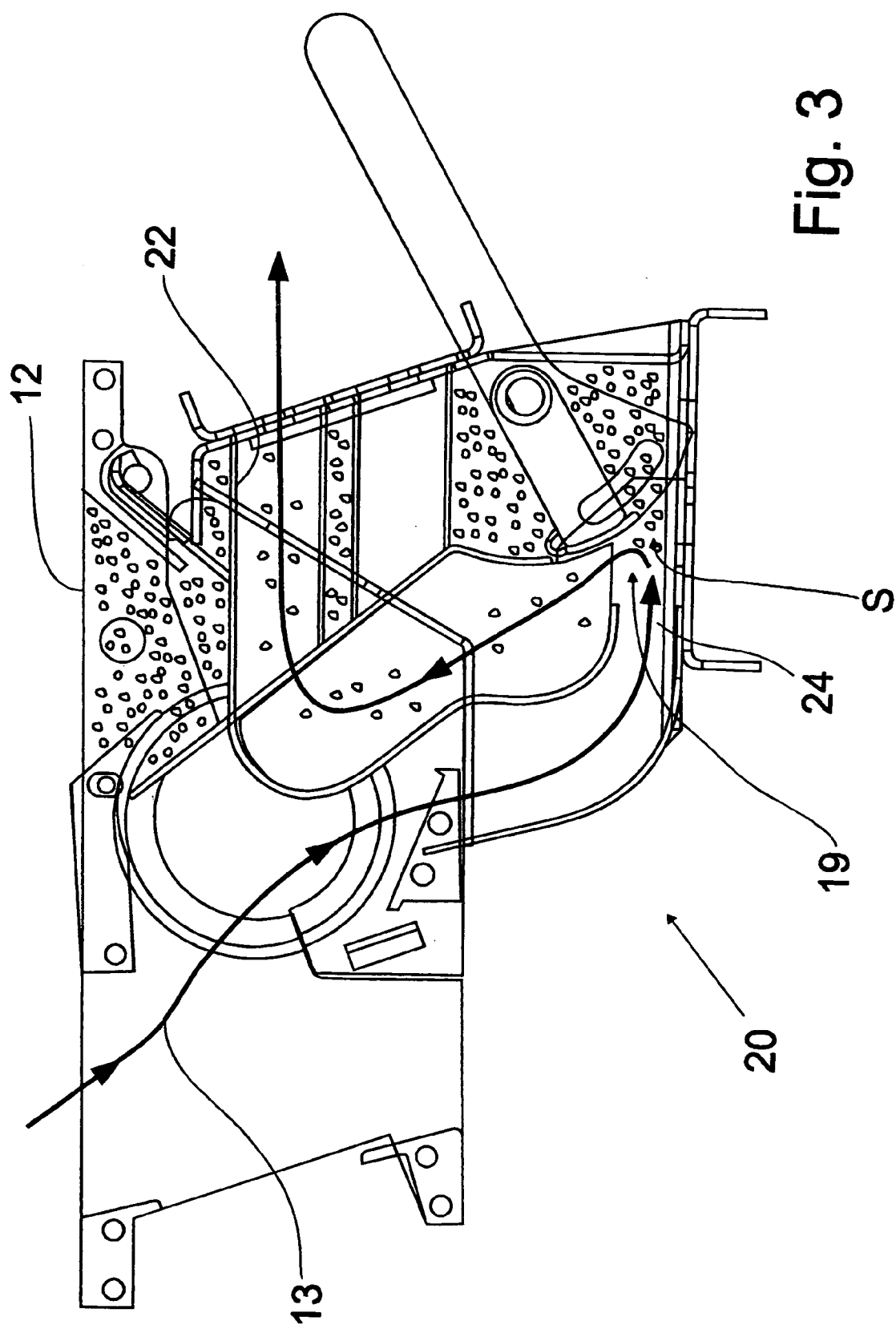
FIG. 3 is an enlarged schematic cross-sectional view of the nurse induction mechanism shown in FIG. 2 to depict the flow of air and seed through the uppermost seed distribution tubes leading to the planting mechanism, the arrows depicting the direction of air flow through the mechanism.
Figure 4:
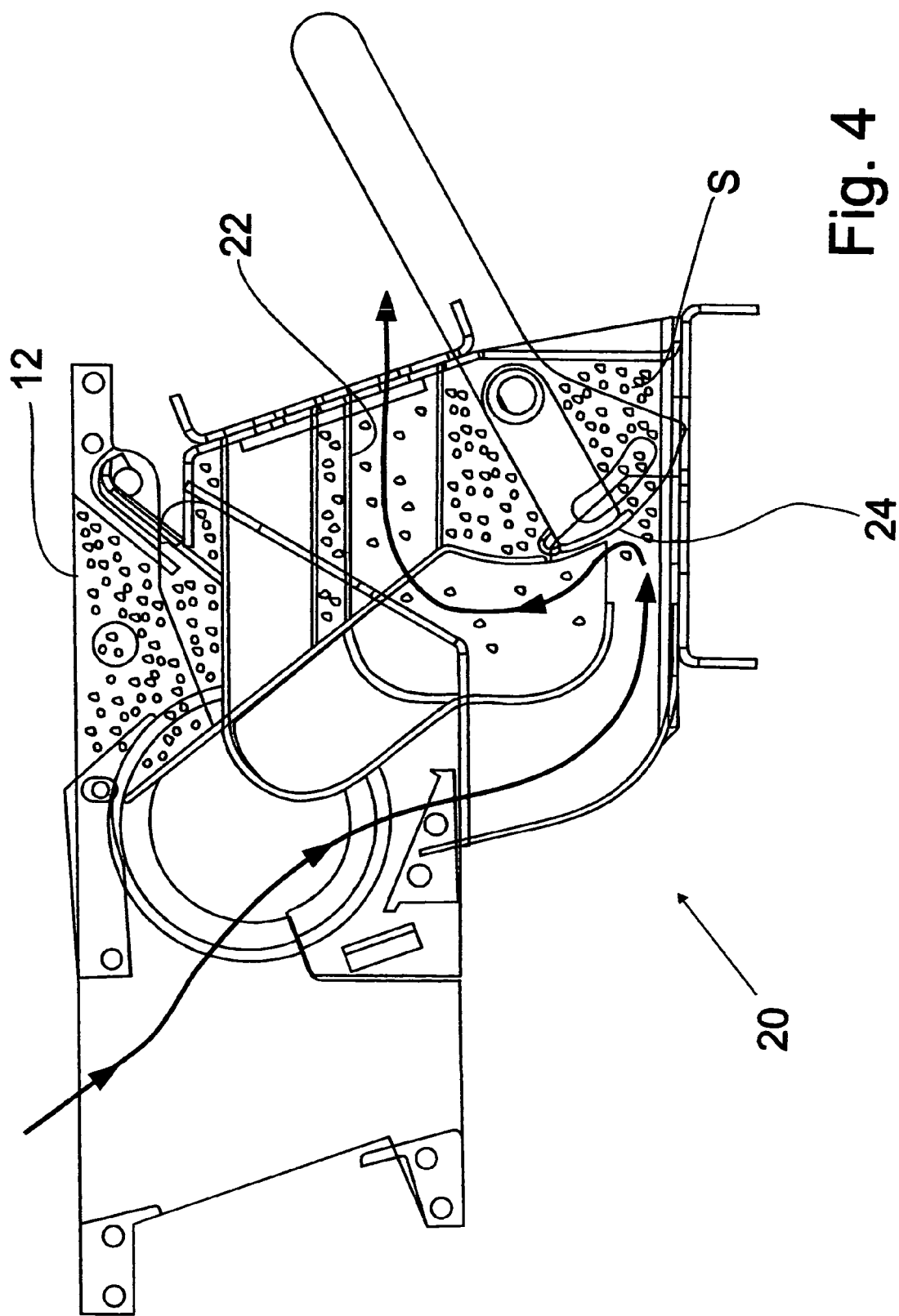
FIG. 4 is an enlarged schematic cross-sectional view similar to that of FIG. 3 except depicting the flow of air and seed through the lowermost seed distribution tubes to the corresponding planting mechanism, the arrows depicting the direction of air flow through the mechanism.
Figure 5:
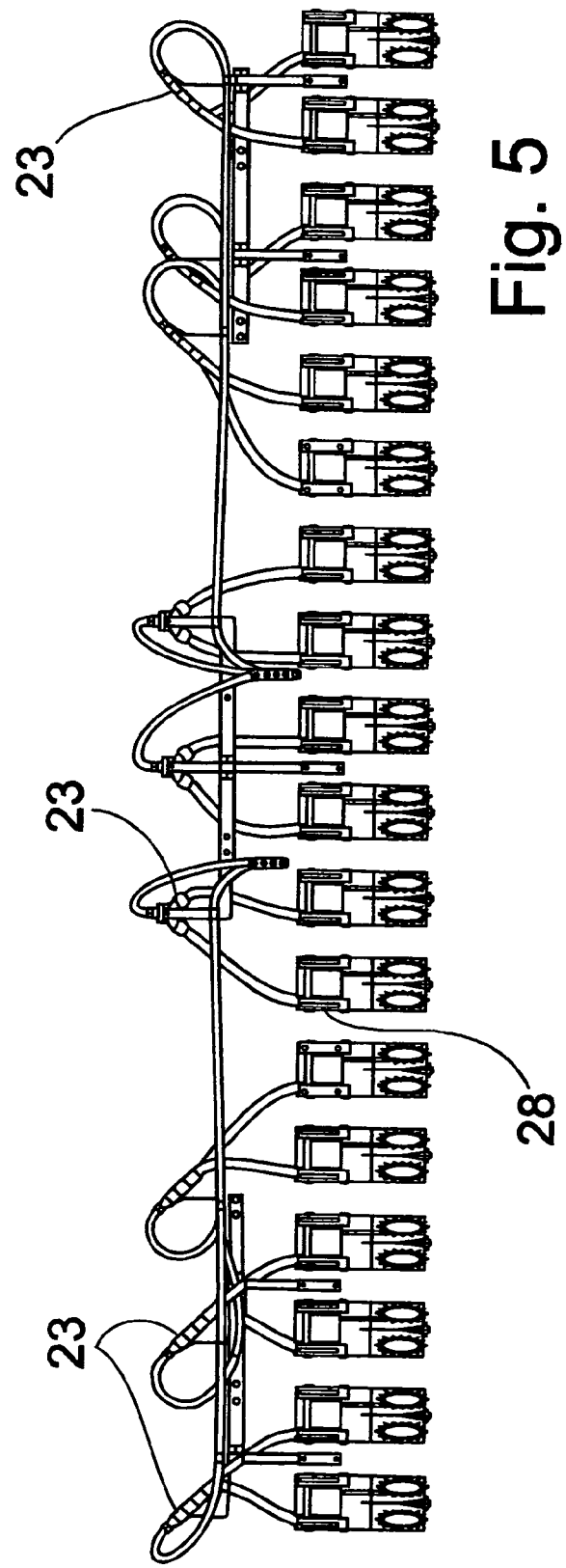
FIG. 5 is a front elevational view of a planting mechanism that can be attached to the air seeder depicted in FIG. 1 with the side wing sections being folded down into an operative position.
Figure 6:
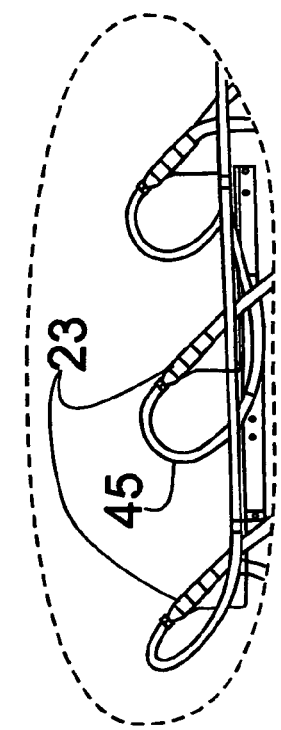
FIG. 6 is an enlarged elevational view of the nurse system receiver apparatus corresponding to the circled mechanism within FIG. 5.
Figure 7:
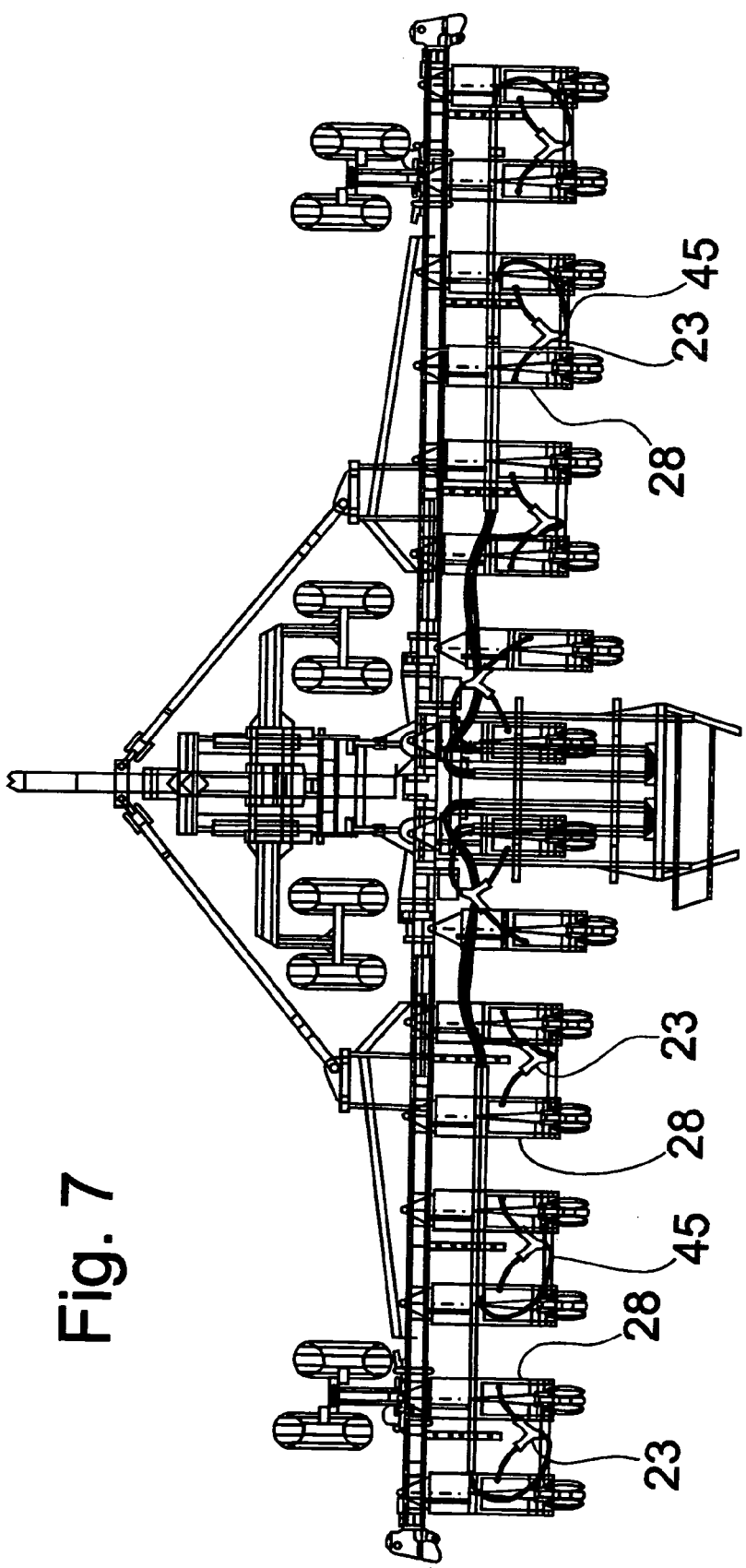
FIG. 7 is a top plan view of a planter mechanism similar to that shown in FIGS. 5 and 6, depicting a single capability nurse distribution system.

Referring first to FIGS. 1–7, the principles of the nurse induction apparatus can best be seen. The nurse inductor 20 enables the use of a standard air cart 10 for both the central hopper and the nurse system air source. The air cart fan can be used for both fertilizing and nursing operations simultaneously. The inductor 20 can be designed in an adapter arrangement which enables the air cart 10 to be readily converted from a roller type volumetric metering system to the nurse inductor system, and vice versa. Such nurse mechanisms are described in, e.g., U.S. Pat. Nos. 6,289,830, 6,298,797, and 6,267,067, to Mayerle et al., the contents of which are incorporated herein by reference in their entirety.

The nurse induction adapter is mounted on a conventional air seeder or air cart, and redirects the air stream 13 coming from the fan 11 in an air cart box 16 into a path that leads through the nurse inductor 20. The air stream is guided into a nozzle region 24 that directs the air along a flow path that tangentially engages a pile of seed particles S exiting the opening 19 at the bottom of the seed hopper 12. The turbulence of the blast of air from the nozzle 24 loosens the seed particles from this assemblage of seed particles S exiting the opening 19 in the bottom of the seed hopper 12, entraining the individual seed particles into the air stream as it follows a path to the distribution lines 22 above the seed particle pile. The individual seed particles remain suspended in the air stream where the air bleeds off and the individual seed particles fall by gravity into a second pile or mass at the planting mechanism.

The details of a single shoot, or single capability nurse distribution mechanism is disclosed in U.S. Pat. No. 6,267,067, the description of which is incorporated herein by reference. As disclosed in the '067 patent., the air stream through the nurse inductor apparatus 20 is split at the general location of the seed particle mass at the bottom of the central seed hopper 12 on the air cart 10 into individual sections that are isolated by generally vertical walls. Each individual section leads to a different seed distribution tube and, ultimately, to a different receiver header 23 and associated receivers 28. In smaller planting systems, the primary nurse lines 22 run directly to the receivers 28 without benefit of a receiver header 23. The nurse inductor 20 induces seed particles into the air stream when and where there is demand for the particles. The demand for particles is controlled by the level of product in each respective receiver 28 or receiver header 23 on the output end of the seed distribution tube. When the receiver 28 or receiver header 23 is full, air is restricted from escaping from the seed distribution tube by the massed seed particles within the seed distribution tube. As a result of the filled receiver or receiver header, the vent therein becomes blocked, which prevents the passage of air there through, thus the air flow and air velocity are reduced due to increased pressurization of the line. This resultant reduction in potential air pressure reduces the capacity of the flow of air to induce the seed particles into the corresponding seed distribution tube. Since the flow of air through the nurse inductor 20 is spread across the entire unit, the flow of air will tend to go to the lines that have open receivers because of the less airflow resistance.

Figure 8:
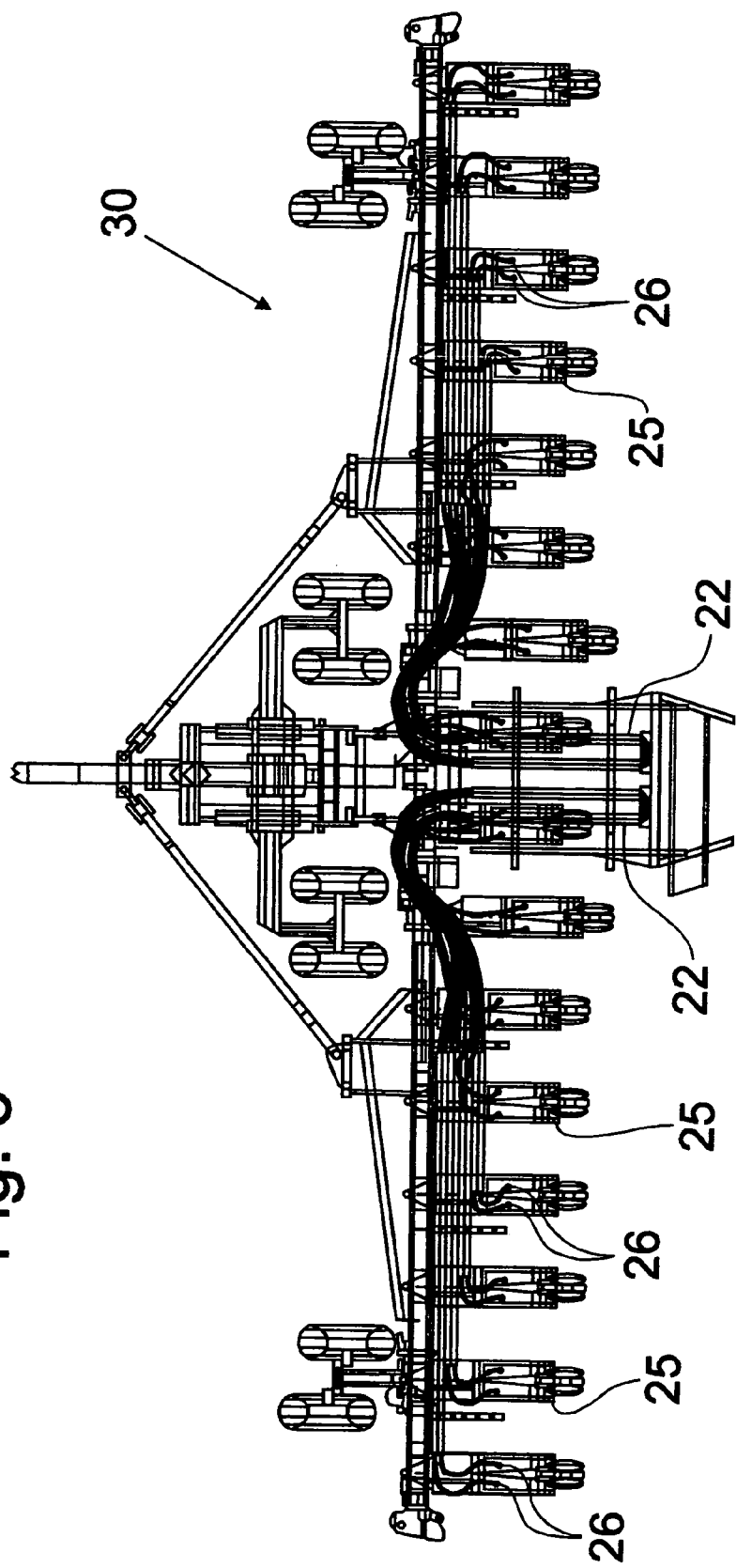
FIG. 8 is a top plan view of a planter mechanism similar to that of FIG. 7 but having a dual capability nurse distribution system.

The preferred configuration for dual capability nursed planters is depicted in FIG. 8 as a parallel distribution system 30 designed with each primary line 22 delivering product to a single row unit 25 or seed meter 26. A nurse distribution line 22 from each central tank 12 is routed to each row unit 25. Each row unit 25 preferably contains two seed meters 26 that are remotely operated when a change in seed type is required, thus providing an instantaneous change in seed variety that may be optionally controlled by a GPS field locater. Accordingly, this dual capability nurse system 30 provides complete independent control of seed varieties.

Alternatively, the preferred configuration of the dual capability nurse system 30 could be arranged to reduce cost and complexity, though at the expense of the time required to switch from one seed variety to another seed variety. A single meter 26 would be mounted on the row unit 25 with a multiple compartment receiver (not shown). The multiple compartment receiver 28 would be provided with a flapper to allow communication between only one compartment at a time and the seed meter 26. An actuator (not shown) to switch between compartments could be remotely activated and electronically controlled by a GPS field locater. A small quantity of seed (e.g., equal to the volume of the seed in the seed meter) would need to be planted to empty the corresponding compartment before communication with the second compartment is initiated. A controller (not shown) would be operable to calculate the time required for the volume of seed remaining in the seed meter 26 to empty. The controller would then timely switch from one compartment to the other to match the location of the changing soil type as defined by a field map. Using a controller in this manner would minimize the time for effecting the change in seed varieties. Alternatively, the second compartment could be opened as the first is closed. This alternative configuration would provide for a greater blended planting time; however, costs would be minimized as the controller, which would use a forecasting algorithm as described above, would not be required.

Figure 10A:
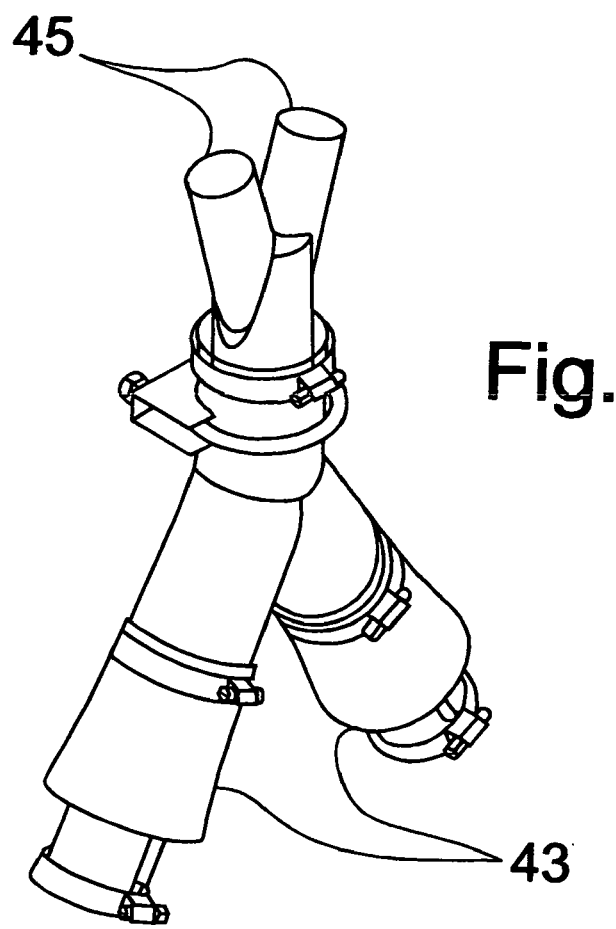
FIG. 10a is an enlarged perspective view of the receiver header delivering nursed seed particles to receiver headers.
Figure 10B:
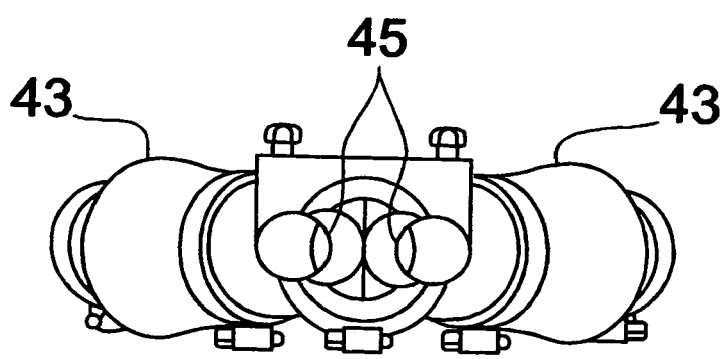
Figure 10C:
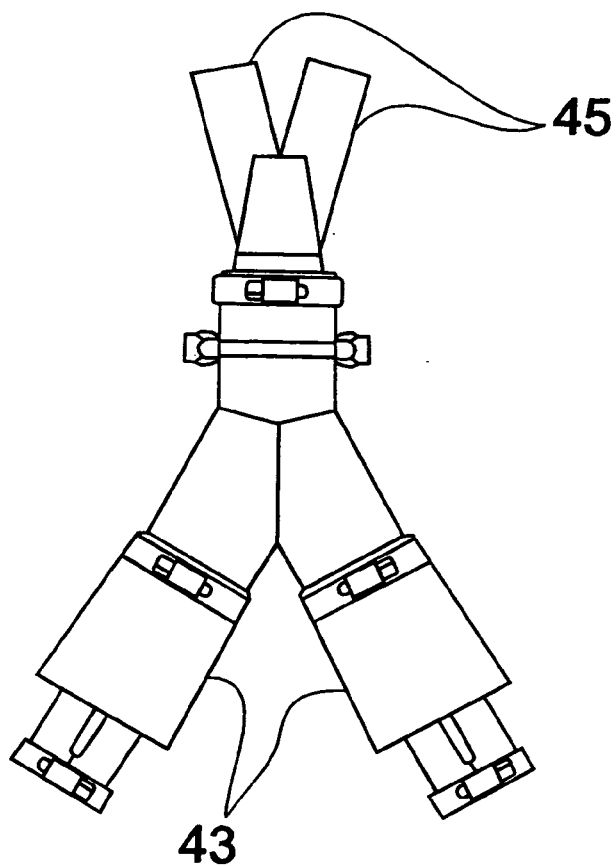
Figure 10D:
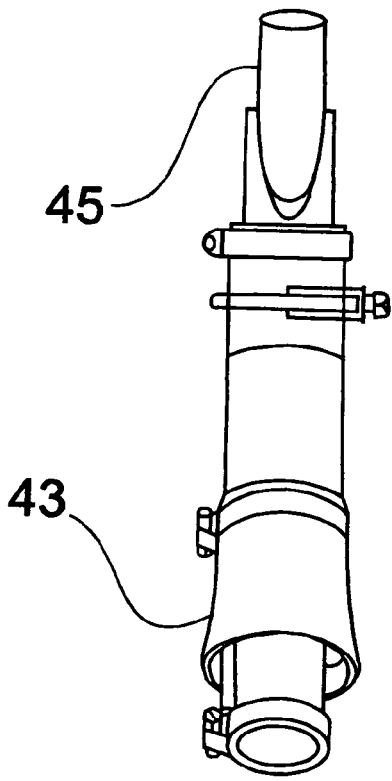

A second preferred dual capability nurse distribution system 32 configuration for nursed planting mechanisms is depicted in FIG. 9. This alternative configuration 32 is also a parallel distribution system designed with each primary line 22 delivering seed product to a nurse header 23 that splits the product to two adjacent row units 25. This second dual capability nurse distribution system 32 presents a cost reduced version as compared to the first preferred dual capability nurse distribution system 30; however, this second system 32 suffers slightly with respect to providing a quick change between seed varieties while planting "on the go". A small receiver 28 is mounted on the seed singulator on each row unit 25. A nurse header 23, shown in FIGS. 10a–10b, with two or more outlets 43 delivers seed down a flexible hose to the receiver 28. The single inlet to the header 23, as is disclosed in aforementioned U.S. Pat. No. 6,267,067, is replaced with two or more inlets 45 allowing product from a corresponding number of central tanks 12 on the air cart 10 to access the receiver 28 and the seed meter. Either the product regulator on the nurse inductor box or the air supply to each tank 12 must be altered to stop the seed delivery from the associated tank 12. Controlling the alteration of the seed delivery can be accomplished remotely to switch seed varieties between the two tanks 12 "on the go". Accordingly, a limited zone within the planted part of the field, when switching from one seed variety to the other in the field, would consequently be planted with a mixture of seed varieties.

A second configuration for smaller nursed planters is a parallel distribution system designed with each primary line delivering product to a single row unit. A small receiver is mounted onto one seed meter on each row unit. The inlet to the receiver is replaced with two or more inlets allowing product from a corresponding number of central tanks access to the receiver and seed meter. The air to the tank or the product regulator on the nurse inductor box would be remotely activated to stop the delivery of seed from one of the tanks and start the delivery to the second tank, thereby switching varieties. As before, there is a zone in the field that would be planted with a mixture of seed varieties.

Figure 11:
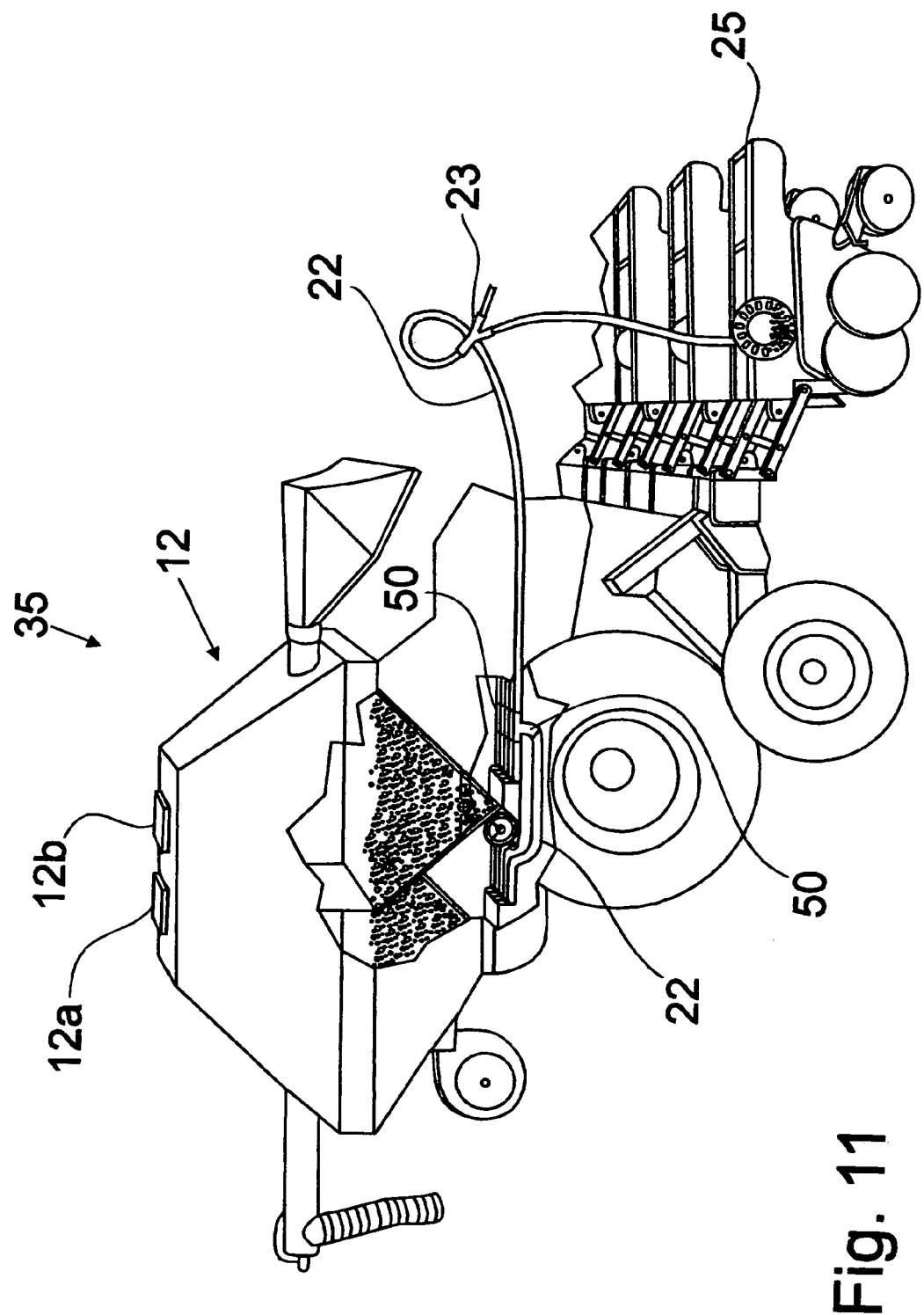
FIG. 11 is a side elevational view of a planter mechanism incorporating an alternative nurse mechanism utilizing a combiner valve.

A third configuration for a dual capability nurse distribution system 35 is shown in FIG. 11, and entails a single-shoot distribution system, as described in the '067 patent, with a combiner/selector valve 50 for each primary nurse line 22, mounted near the central tanks 12. The combiner/selector valve 50 is designed to allow the flow of seeds from one of the tanks 12a, 12b. A single primary nurse line 22 from each tank 12a,12b is combined at the valve 50, which is configured to allow seed flow from one of the central tanks 12 to the row unit 25 or nurse header 23. For example, on a 40 foot wide planter configured to plant seeds in rows having a 30 inch spacing, sixteen seed meters are fed with eight primary nurse lines 22. A bank of eight combiner valves 50 could be configured to use the entire seed product from tank 12a before switching to access the seed product from the second tank 12b. An alternative configuration of the combiner/selector valve bank 50 could involve four combiner valves 50 cooperable with the first tank 12a and four additional combiner valves 50 cooperable with the second tank 12b, thus allowing tanks 12a and 12b to drain simultaneously, if tanks 12a and 12b were of equal size. This configuration would give the operator the capability to carry additional seed for additional fields, or alternatively, to use the entire capacity of the combined tanks 12 in one field. The operation of the combiner/selector valves 50 could be remotely controlled to change tanks "on the go"; however, the use of a remote controller would create greater lag times compared to above-described configurations, but would be the most cost-effective method of delivering seed product from the two tanks 12a, 12b to the entire width of the planter mechanism, either individually or simultaneously.

Figure 12:
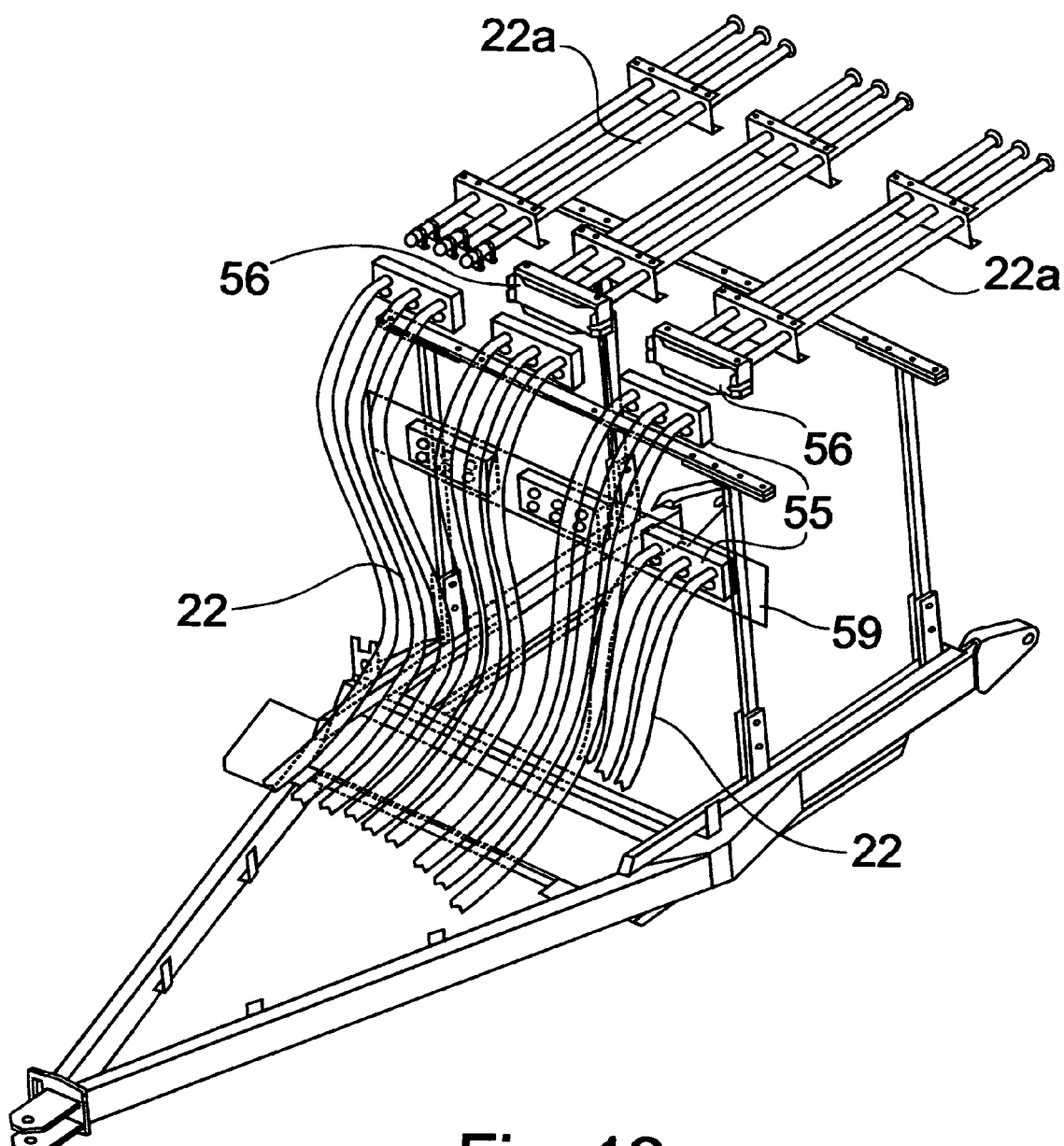
FIG. 12 is a partial schematic view of the quick connect mechanism for the primary nurse lines from each product supply tank to connect the planter primary nurse lines to deliver seed to each row unit.

An alternate embodiment of the third dual capability nurse distribution system 35, configuration includes structure to permit a quick change of distribution lines 22 between tanks 12a, 12b. As depicted in FIG. 12, the primary nurse lines 22 from the tanks 12a, 12b are supported in groups on a plurality of quick-connect mechanisms 55. A corresponding quick connect adapter structure 56 is engagable with and cooperable with the quick connect mechanisms 55 to couple the primary nurse lines 22 to the product delivery lines 22a to allow seed product to be delivered from the tanks 12a, 12b. Since the quick connect mechanisms 55 can be individually connected to a corresponding quick connect adapter 56, seed product can be delivered from the first tank 12a by connecting the quick connect mechanisms 55 associated the first tank 12a to all of the adapters 56, or from the second tank 12b by connecting the quick connect mechanisms 55 associated with the second tank 12b to all of the adapters 56, or to combine delivery of seed product from both tanks 12a, 12b by connecting selected quick connect mechanisms 55 from both tanks 12a, 12b (mixing and matching as desired) to the adapters 56.

The unused quick connect mechanisms 55 can be stored on an adjacent mounting bracket 59 to seal the ends of the primary nurse lines 22 which eliminates airflow, and, as a result, eliminates product being nursed down the inactive lines 22. The operator can selectively arrange the quick connect mechanisms 55 to get the desired seed product mix from the desired tanks 12a, 12b. The utilization of the quick connect mechanisms 55 is an alternative to the use of a combiner/selector valve 50 as describe above. The potential cost savings of the quick connect mechanisms 55 is offset by the inconvenience of having to manually switch quick connect mechanisms 55 each time a different seed variety mix is desired.

One skilled in the art will recognize that a combinations of FIGS. 11 and 12 would result in a quick connect mechanism 55 located at the beginning at the nurse distribution lines 22 where the lines 22 originate at the nurse inductor box 20 instead of at the distal end of the distribution lines 22 as is shown in FIG. 12. Such a configuration would permit the distribution lines 22 to be quickly and easily attached to either nurse mechanism 20 associated with two tanks 12a, 12b. In this configuration, only one of the nurse mechanisms 20 would be operable at a time to deliver seed to all of the row units across the transverse width of the associated planting mechanism that are activated for engagement with the ground for planting seeds therein. One skilled in the art will recognize that in some planter configurations, some row units are not activated when planting certain crops. For example, for a planter mechanism configured to plant soy beans in rows have a 15 inch spacing, the same configuration can be used to plant corn at 30 inch row spacings by deactivating alternate row units. The principal of the instant invention would provide a nurse mechanism that would be selectively operable to distribute seed from one of two tanks to those row units that are activated and engaged with the ground for the purpose of planting seed.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In an agricultural planting implement having a frame adapted for movement over the ground, a first tank supported on said frame for carrying a first supply of seed, a second tank supported on said frame for carrying a second supply of seed, each said tank having a lower portion including a discharge opening through which seed particles pass to exit said tank; a mechanism for creating a flow of air through a conduit associated with each said tank; and a remote planting mechanism engageable with the ground for the planting of seeds therein, the improvement comprising;

a first nurse mechanism associated with said first tank and a second nurse mechanism associated with said second tank, each first and second nurse mechanism configured to communicate with the corresponding said discharge opening and said corresponding conduit to receive seeds from said first and second tanks, respectively, and convey said seeds toward said planting mechanism through one of a first plurality and a second plurality of primary nurse lines; and each of said first of primary nurse lines from said first nurse mechanism being connected via a first connect mechanism to an adapter having a plurality of distribution lines extending therefrom in communication with said planting mechanism, wherein each said adapter is configured to disconnect from each of said first plurality of connect mechanisms and connect to each of said second plurality of connect mechanisms so as to switch from delivering the first supply of seed via the first nurse mechanism from the first tank to delivering the second supply of seed via the second nurse mechanism from the second tank to the planting mechanism.

2. In an agricultural planting implement having a frame adapted for movement over the ground, a first tank supported on said frame for carrying a first supply of seed, a second tank supported on said frame for carrying a second supply of seed,, each said tank having a lower portion including a discharge opening through which seed particles pass to exit said tank; a mechanism for creating a flow of air through a conduit associated with each said tank; and a remote planting mechanism engageable with the ground for the planting of seeds therein, the improvement comprising;

a nurse mechanism associated with each said tank to communicate with the corresponding said discharge opening and said corresponding conduit to receive seeds from said tank and convey said seeds toward said planting mechanism through primary nurse lines; and said primary nurse lines from each said nurse mechanism being divided into a plurality of groups, each said group of primary nurse lines being connected to a connect mechanism which is engageable with an adapter having distribution lines extending therefrom to said planting mechanism, each said adapter being selectively cooperable with more than one connect mechanism to permit a selective conveyance of seeds from a desired one of said tanks, further comprising:

a mounting bracket positioned proximate to said adapters to engage all connect mechanisms not coupled to said adapters.

3. The agricultural planting implement of claim 2, wherein said mounting bracket is operable to seal said primary nurse lines when the corresponding said connect mechanisms are engaged therewith.

4. The agricultural planting implement of claim 3, wherein said planting mechanism can receive seed product from a selected mix of seeds from each of said tanks.

5. The agricultural planting implement of claim 4, wherein said connect mechanisms number twice as many as said adapters.

6. In an agricultural planting implement having a frame adapted for movement over the ground, a first tank supported on said frame for carrying a first supply of seed, a second tank supported on said frame for carrying a second supply of seed, each said tank having a lower portion including a discharge opening through which seed particles pass to exit said tank; a mechanism for creating a flow of air through a conduit associated with each said tank; and a remote planting mechanism engageable with the ground for the planting of seeds therein, the improvement comprising;

a nurse means associated with each said tank to communicate with the corresponding said discharge opening for receiving seeds from the respective said tank and conveying said seeds toward said planting mechanism through primary nurse lines, each said nurse means being provided with a connect means for connection thereof with said primary nurse lines;

said primary nurse lines being selectively connectable through said connect means to either of said nurse means thereby permitting the flow of seeds from a selected one of said nurse means at a time to each seed meter of the planting mechanism; and a mounting means for sealing said primary nurse lines when the corresponding said connect means that are not coupled to adapters are engaged therewith.

* * * * *